United States Patent
Yoshikawa et al.

(10) Patent No.: US 12,403,904 B2
(45) Date of Patent: Sep. 2, 2025

(54) CONTROL MODIFICATION DEVICE FOR VEHICLE

(71) Applicant: HONDA MOTOR CO., LTD., Tokyo (JP)

(72) Inventors: Fumiaki Yoshikawa, Tokyo (JP);
Hisanori Yanagida, Tokyo (JP);
Satoshi Matsushita, Tokyo (JP);
Takashi Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 18/189,361

(22) Filed: Mar. 24, 2023

(65) Prior Publication Data
US 2023/0311872 A1 Oct. 5, 2023

(30) Foreign Application Priority Data
Mar. 31, 2022 (JP) ................................. 2022-057774

(51) Int. Cl.
B60W 30/14 (2006.01)
B60W 50/08 (2020.01)
(Continued)

(52) U.S. Cl.
CPC ........ B60W 30/146 (2013.01); B60W 50/085 (2013.01); B60W 50/10 (2013.01);
(Continued)

(58) Field of Classification Search
CPC .. B60W 30/146; B60W 50/085; B60W 50/10; B60W 50/14; B60W 2050/146;
(Continued)

(56) References Cited

U.S. PATENT DOCUMENTS 6,868,170 B1 * 3/2005 Fuku .................... B60R 25/252
340/5.53
8,751,065 B1 * 6/2014 Kato .................... B60R 16/037
340/426.2
(Continued)

FOREIGN PATENT DOCUMENTS

| JP | 2011-192031 A | 9/2011 |
| JP | 2021-179664 A | 11/2021 |
| KR | 20210057971 A | 5/2021 |

OTHER PUBLICATIONS

Toyota Motor Corporation released a new "Sudden accelerator acceleration suppression" system, [online], Jul. 1, 2020, [searched on Mar. 1, 2022], Internet, <URL:https://global.toyota/jp/newsroom/corporate/33012004.html>; English translation included, 8 pages.
(Continued)

Primary Examiner — Thomas E Worden
Assistant Examiner — Madison B Emmett
(74) Attorney, Agent, or Firm — Rankin, Hill & Clark LLP (57) ABSTRACT

A control modification device for vehicle includes: an acceleration suppression control part against sudden accelerator step-down that is mounted in a subject vehicle and is configured to limit a speed of the vehicle when a speed of an accelerator pedal step-down exceeds a prescribed threshold; an ID key that stores therein setting information showing whether a function of the acceleration suppression control part against sudden accelerator step-down is made valid or invalid; a setting change part that is configured to recognize the setting information stored in the ID key and change a setting based on the recognized result; and a control switch part that is mounted on the vehicle and is configured to prompt a user of the vehicle to select and switch whether the function of the acceleration suppression control part against
(Continued)

sudden accelerator step-down is made valid or invalid, independently from the result of the setting change.

5 Claims, 6 Drawing Sheets

(51) Int. Cl.
*B60W 50/10* (2012.01)
*B60W 50/14* (2020.01)

(52) U.S. Cl.
CPC ....... *B60W 50/14* (2013.01); *B60W 2050/146* (2013.01); *B60W 2540/043* (2020.02)

(58) Field of Classification Search
CPC ....... B60W 2540/043; B60W 50/0098; B60W 2050/0063; B60W 2050/0064; B60W 2540/106; B60W 2540/215; B60W 50/087; B60K 31/00; B60K 26/02; B60K 2031/0091; B60R 25/04
See application file for complete search history.

(56) References Cited

U.S. PATENT DOCUMENTS

| | | | |
|---|---|---|---|
| 9,842,448 B1* | 12/2017 | Lickfelt | G07C 9/00896 |
| 11,945,432 B2* | 4/2024 | Naka | B60W 30/09 |
| 2014/0087917 A1* | 3/2014 | Tanaka | B60W 10/06 477/3 |
| 2014/0188310 A1* | 7/2014 | Hatfield | B60R 16/0231 701/2 |
| 2015/0246676 A1* | 9/2015 | Keren | B60W 30/146 701/93 |
| 2018/0257655 A1* | 9/2018 | Westover | B60W 10/06 |
| 2020/0310406 A1* | 10/2020 | Lavoie | G05D 1/0016 |
| 2023/0245223 A1 | 8/2023 | Okai et al. | |
| 2023/0306092 A1* | 9/2023 | Yahata | B60R 25/24 |
| 2023/0366463 A1* | 11/2023 | Yudell | F16H 37/021 |

OTHER PUBLICATIONS

Japanese Office Action received in corresponding Japanese application No. 2022-057774 dated Oct. 31, 2023 with English translation (13 pages).

* cited by examiner

| Key ID | Name Information | Acceleration Suppression Valid/Invalid Data 350 | |
|---|---|---|---|
| | | Setting Data | Activation Enable/Disable Data |
| AA0001 | Mr. A | Valid | Enable |
| AA0002 | Ms. B | Invalid | Enable |
| AA0003 | – | Invalid | Disable |
| – | – | – | – |

CONTROL MODIFICATION DEVICE FOR VEHICLE

CROSS REFERENCE TO RELATED APPLICATIONS

This application claims the benefit of Japanese Patent Application No. 2022-057774 filed on Mar. 31, 2022, the disclosure of which is incorporated herein by reference.

BACKGROUND OF THE INVENTION

1. Field of the Invention

The present invention relates to a control modification device for vehicle.

2. Description of the Related Art

Some vehicles are recently equipped with acceleration suppression function against sudden accelerator step-down, so as to limit a speed of the vehicle, when a speed at which an accelerator pedal is stepped down exceeds a prescribed threshold. For example, Non-Patent Document 1 discloses a system in which, when a door of a vehicle is unlocked with a dedicated key, the acceleration suppression function against sudden accelerator step-down starts up automatically.

[Non-Patent Document 1] "Toyota Motor Corporation released a new "Sudden accelerator acceleration suppression" system", [online], Jul. 1, 2020, [searched on Mar. 1, 2022], Internet <URL: https://global.toyota/jp/newsroom/corporate/33012004.html>

SUMMARY OF THE INVENTION

The technique of Non-Patent Document 1 realizes the acceleration suppression function against sudden accelerator step-down of a vehicle by using a dedicated key. In other words, if a driver of the vehicle carries not the dedicated key but a key with which the acceleration suppression function against sudden accelerator step-down is not valid, there is no way for the driver to make the acceleration suppression function against sudden accelerator step-down valid. For example, when an elderly person with an intention of using the acceleration suppression function against sudden accelerator step-down may mistakenly carry with him/her not a dedicated key but a standard key used by any other person in his/her family, the function will not be enabled. He/she carrying the standard key with him/her then needs to open and close a door of the vehicle again so as to turn back home to get the dedicated key, which reduces operability of the vehicle.

In order to solve the problems as described above, the present invention has been made in an attempt to improve vehicle operability until when an acceleration suppression function against sudden accelerator step-down is realized. This also improve traffic safety and contributes to development of a sustainable transportation system. The present invention has been thus made in an attempt to provide a control modification device for vehicle that can set an acceleration suppression control against sudden accelerator step-down to valid or invalid in accordance with a driver of the vehicle.

A first aspect of the present invention provides a control modification device for vehicle that includes: an acceleration suppression control part against sudden accelerator step-down that is mounted in a subject vehicle and is configured to limit a speed of the vehicle when a speed of an accelerator pedal step-down exceeds a prescribed threshold; an ID key that stores therein setting information showing whether a function of the acceleration suppression control part against sudden accelerator step-down is made valid or invalid; a setting change part that is configured to recognize the setting information stored in the ID key and change a setting based on the recognized result; and a control switch part that is mounted on the vehicle and is configured to prompt a user of the vehicle to select and switch whether the function of the acceleration suppression control part against sudden accelerator step-down is made valid or invalid, independently from the result of the setting change.

A second aspect of the present invention provides a control modification device for vehicle that includes: a wireless communication part that is configured to receive a key ID from an ID key of a subject vehicle and also receive setting information showing whether an acceleration suppression function against sudden accelerator step-down is made valid or invalid, the acceleration suppression function against sudden accelerator step-down being used for limiting a speed of the vehicle; a control switch part that is configured to prompt a user of the vehicle to select and switch whether the acceleration suppression function against sudden accelerator step-down is made valid or invalid, independently from the received setting information; and an acceleration suppression control part against sudden accelerator step-down that is configured to limit the speed of the vehicle, based on information prompted to be switched by the control switch part, when a speed of an accelerator pedal step-down exceeds a prescribed threshold.

The present invention can improve operability of a vehicle until when an acceleration suppression function against sudden accelerator step-down is realized.

DETAILED DESCRIPTION OF THE EMBODIMENTS

An embodiment of the present invention (which may be simply referred to as an "embodiment" hereinafter) is described in detail with reference to the related drawings. Note that each of the figures is schematically illustrated to such an extent that the embodiment can be well understood. In the figures, the same reference numerals are given to the same or similar components and description thereof is omitted herefrom.
(Embodiment)

FIG. 1A to FIG. 1E are each a diagram for explaining functions of a control modification system for vehicle as a control modification device for vehicle according to an embodiment of the present invention.

In FIG. 1A to FIG. 1E, FOB (Frequency Operated Button) keys 200, 201 are used for locking or unlocking a door of a vehicle 100. A PC 250 is used when a dealer performs initial setting of the FOB keys 200, 201. The vehicle 100 has an acceleration suppression function against sudden accelerator step-down which limits a speed of the subject vehicle 100, when a speed of an accelerator pedal step-down exceeds a prescribed threshold.

Figure 1A:
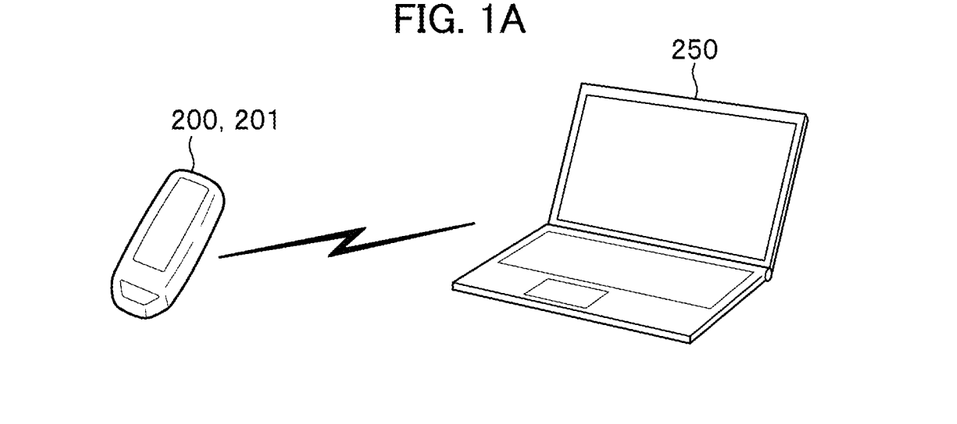
FIG. 1A is a diagram for explaining functions of a control modification device for vehicle and a control modification system for vehicle according to an embodiment of the present invention.

FIG. 1A illustrates that a dealer performs an initial setting of the FOB key 200 or 201 using the PC 250. Contents of the initial setting include: a key ID 71 (FIG. 2) which is used for locking or unlocking a door of the vehicle 100; acceleration suppression control valid/invalid setting data 73 (FIG. 2) which is setting information showing that an acceleration suppression function against sudden accelerator step-down of vehicle 100 is made valid or invalid; and user information (for example, name information 72 (FIG. 2)) for identifying respective users of the FOB keys 200, 201. This makes it possible to set whether the acceleration suppression function against sudden accelerator step-down is made valid or invalid for each of the FOB keys 200, 201. For example, the PC 250 sets the FOB key 200 to "valid"; and, the FOB key 201, "invalid". In other words, the PC 250 serves as a setting change part that recognizes information on setting of the FOB keys 200, 201 and change the setting to appropriate one, based on the recognized information.

Figure 1B:
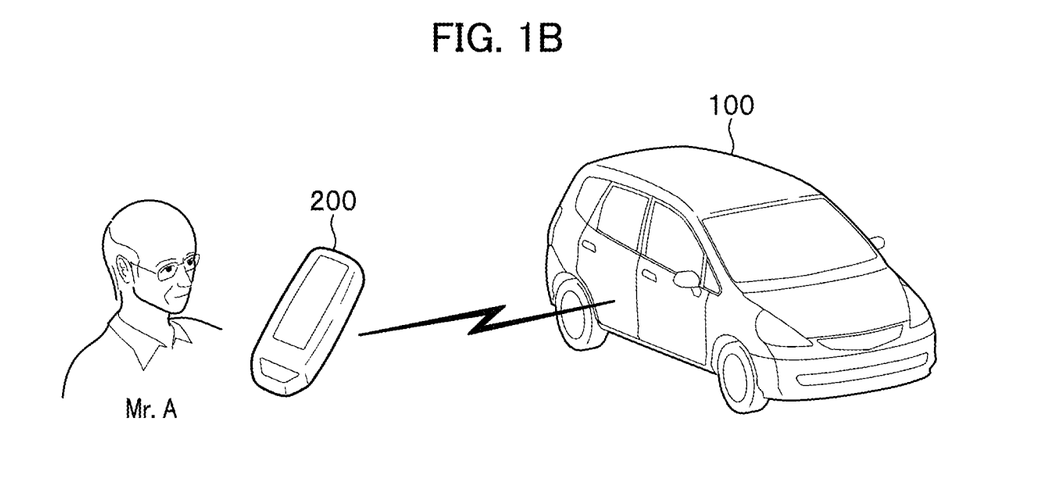
FIG. 1B is another diagram for explaining the functions of the control modification device for vehicle and the control modification system for vehicle according to the embodiment.
Figure 1C:
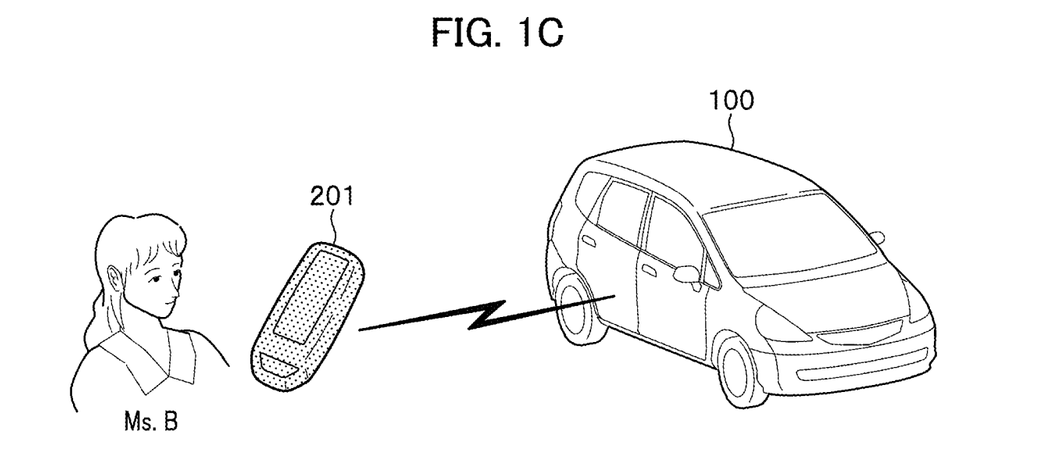
FIG. 1C is a still another diagram for explaining the functions of the control modification device for vehicle and the control modification system for vehicle according to the embodiment.
Figure 1D:
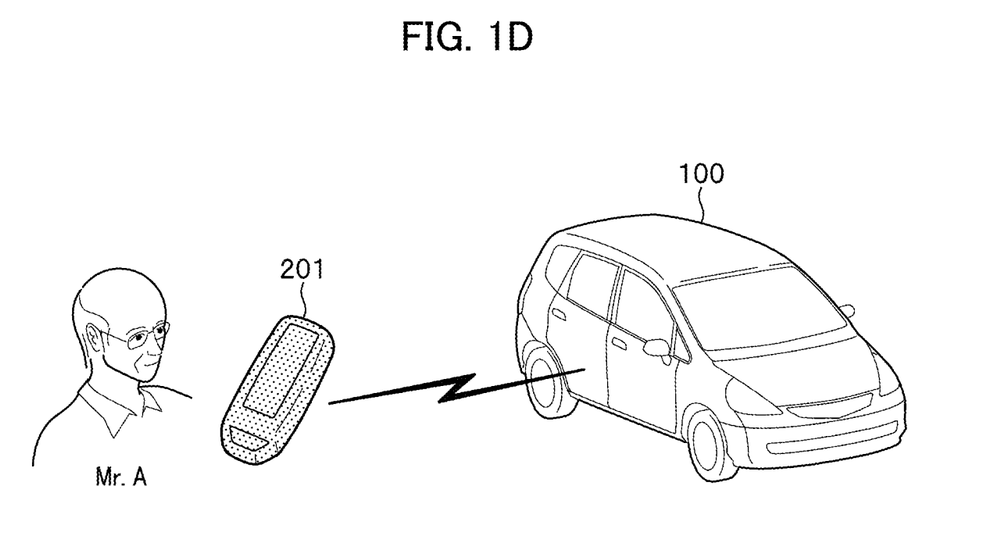
FIG. 1D is a yet another diagram for explaining the functions of the control modification device for vehicle and the control modification system for vehicle according to the embodiment.
Figure 1E:
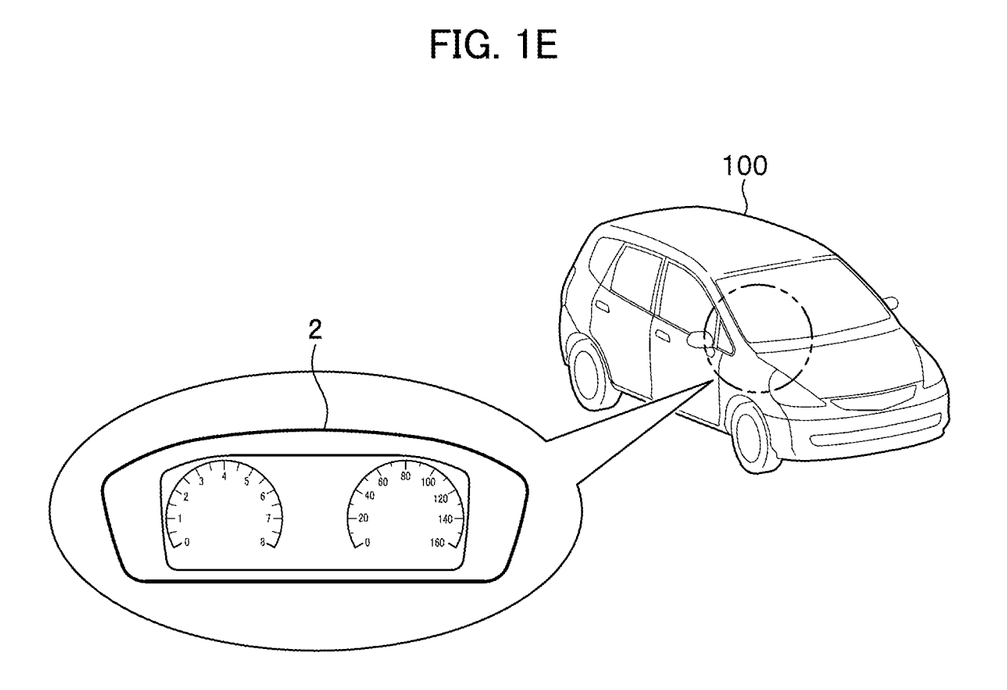
FIG. 1E is a further diagram for explaining the functions of the control modification device for vehicle and the control modification system for vehicle according to the embodiment.

FIG. 1B illustrates that, when "Mr. A" who is an elderly person unlocks the door of the vehicle 100 using the FOB key 200 and gets into the vehicle 10, then an acceleration suppression function against sudden accelerator step-down becomes "valid". FIG. 1C illustrates that, when "Ms. B" who is a family member of Mr. A and is younger than Mr. A unlocks the door of the vehicle 100 using the FOB key 201 and gets into the vehicle 10, then the acceleration suppression function against sudden accelerator step-down becomes "invalid". FIG. 1D illustrates that, when Mr. A carries the FOB key 201 with him, unlocks the door of the vehicle 100 with the FOB key 201, and gets into the vehicle, then the acceleration suppression function against sudden accelerator step-down becomes "invalid", even though Mr. A as the elderly person wants to use the function.

Therefore, in this embodiment, when Mr. A unlocks the door of the vehicle 100 with the FOB key 201 of which acceleration suppression function against sudden accelerator step-down is set to "invalid", Mr. A can change the function as "valid" using a display operation part 2 illustrated in FIG. 1E. In other words, though a dealer of the vehicle 100 previously set the function to "invalid" using the PC 250, Mr. A can change the setting of the function to "valid".

Figure 2:
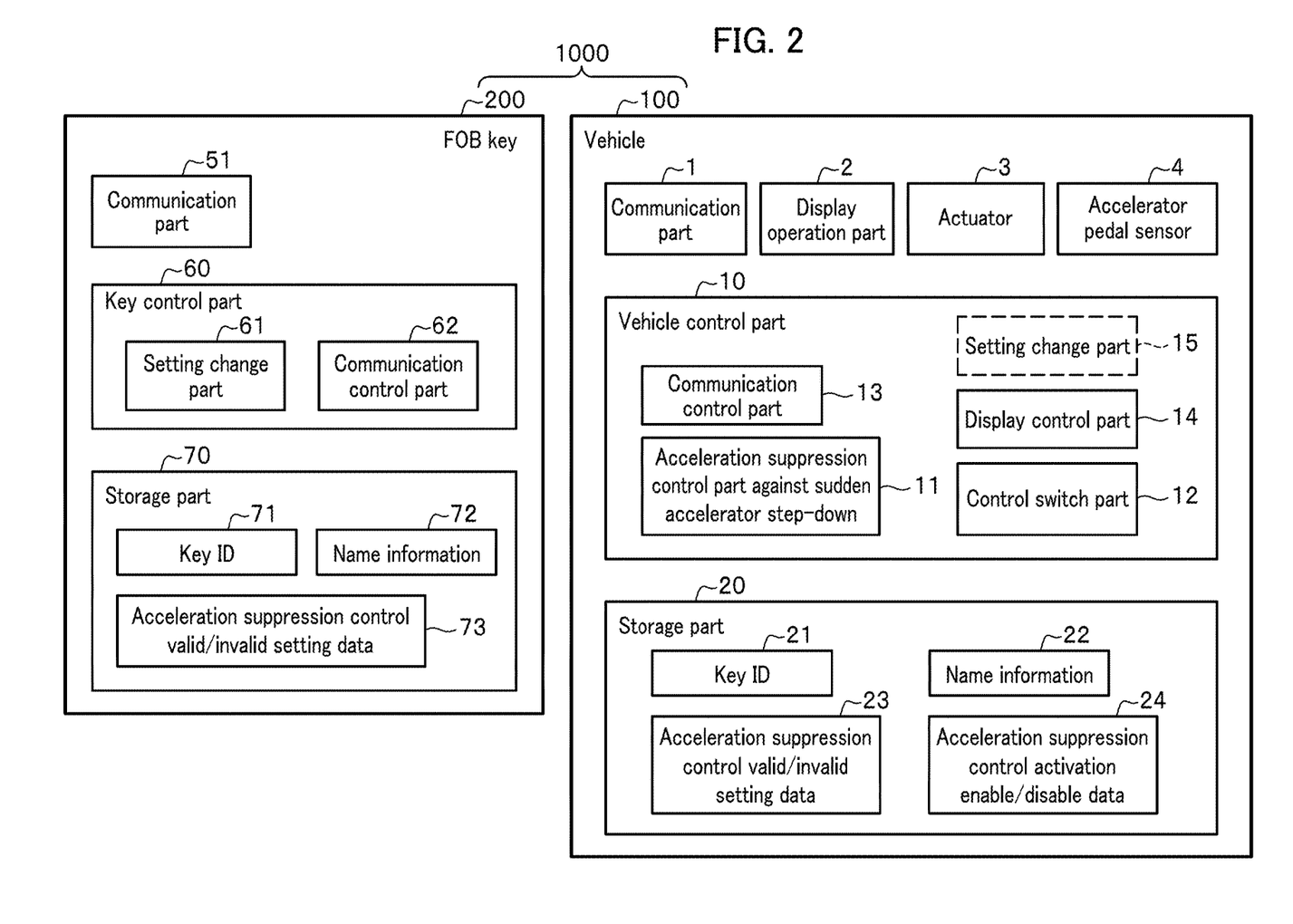
FIG. 2 is a diagram illustrating a configuration of the control modification device for vehicle and the control modification system for vehicle according to the embodiment.

FIG. 2 is a diagram illustrating a configuration of the control modification system for vehicle as the control modification device for vehicle according to the embodiment of the present invention.

A control modification system for vehicle 1000: includes the vehicle 100 and the FOB key 200; and serves as the control modification device for vehicle as a whole. Note that the system 1000 may include the FOB key 201, . . . , instead of the FOB key 200. The FOB key 200 includes a communication part 51, a key control part 60, and a storage part 70. The storage part 70: is a non-volatile storage part such as a FROM (Flash Read Only Memory); and stores therein a program and setting information of various types. The setting information includes the key ID 71, the acceleration suppression control valid/invalid setting data 73, and the name information 72.

The key ID 71 is an ID unique to the FOB key 200. Note that the storage part 20 of the vehicle 100 also stores therein an ID same as the key ID 71, as a key ID 21. The name information 72: is information on a name of an owner of the FOB key 200; and is displayed in the display operation part 2 of the vehicle 100 where necessary. The acceleration suppression control valid/invalid setting data 73 is setting information on whether the acceleration suppression function against sudden accelerator step-down is previously set to "valid" or "invalid". Based on the data 73, whether the acceleration suppression function against sudden accelerator step-down of the vehicle 100 is made valid or invalid is set for each of the FOB key 200 and the like.

The communication part 51 performs a wireless near field communication with the communication part 1 or the PC 250 (FIG. 1A) of the vehicle 100. The key control part 60: is a CPU (Central Processing Unit); and executes a program to thereby realize functions of the setting change part 61 and the communication control part 62. The communication control part 62 is a function part for controlling the communication part 51. The setting change part 61 is a function part for changing (updating) the setting information stored in the storage part 70 by performing a wireless near field communication with the PC 250 (FIG. 1A). Note that the vehicle 100 may further include a setting change part 15 illustrated with a broken line, that performs functions otherwise performed by the PC 250 (functions of receiving the acceleration suppression control valid/invalid setting data 73 stored in the FOB key 200, and changing the received acceleration suppression control valid/invalid setting data 73 stored in the FOB key 200 to an appropriate setting value).

The vehicle 100 includes the communication part 1, the display operation part 2, an actuator 3, an accelerator pedal sensor 4, a vehicle control part 10, and the storage part 20. The communication part 1 performs a wireless near field communication with the communication part 51 of the FOB key 200. The display operation part 2 is a touch panel disposed on a front part of a driver's seat (see FIG. 1E). The actuator 3 drives an electric motor for driving a wheel or a fuel injection valve. The accelerator pedal sensor 4 detects an amount of depression of an accelerator pedal.

The storage part 20: is a non-volatile storage part such as a FROM; and includes respective storage areas of the key ID 21, the name information 22, the acceleration suppression control valid/invalid setting data 23, and acceleration suppression control activation enable/disable data 24. The key ID 21 is an ID same as the key ID 71 stored in each of a plurality of the FOB keys 200, 201, . . . . The name information 22 is information corresponding to the name information 72 stored in each of a plurality of the FOB keys 200, 201, . . . and received via the communication part 1. The acceleration suppression control valid/invalid setting data 23 is data corresponding to the acceleration suppression control valid/invalid setting data 73 stored in each of a plurality of the FOB keys 200, 201, . . . and received via the communication part 1. The acceleration suppression control activation enable/disable data 24 is data referenced when the vehicle control part 10 determines whether or not an acceleration suppression control is provided. The acceleration suppression control activation enable/disable data 24 is a copy of the acceleration suppression control valid/invalid setting data 23 or a data changed therefrom.

Figure 3:
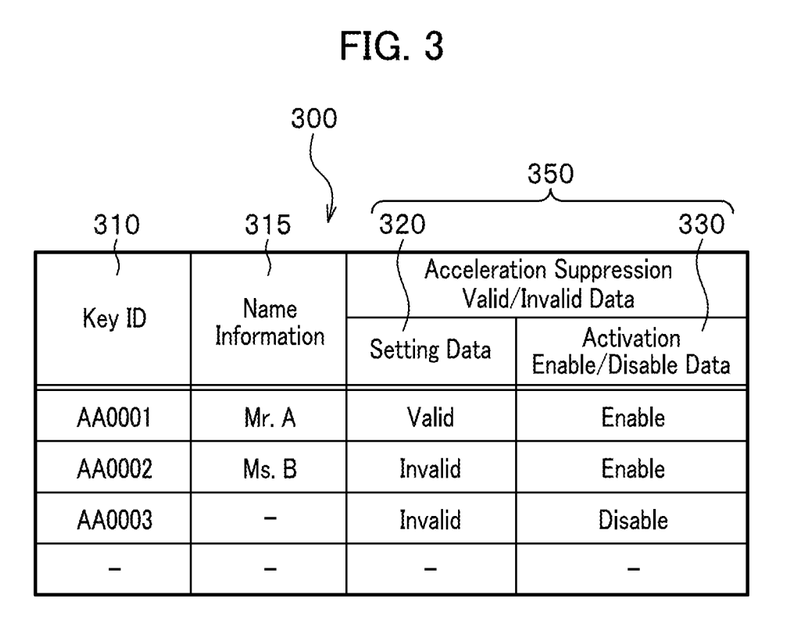
FIG. 3 is a diagram illustrating an example of data stored in a storage part of a vehicle according to the embodiment.

FIG. 3 is a diagram illustrating an example of data stored in the storage part 20 of the vehicle 100.

Acceleration suppression valid/invalid data 300 contains a "Key ID" column 310, a "Name Information" column 315, a "Setting Data" column 320, and an "Activation Enable/Disable Data" column 330. The "Key ID" column 310 contains the key ID 21 (FIG. 2) for each of the FOB keys 200, 201, . . . . The name information 72 is stored in the "Name Information" column 315, when the name information 72 is received from any of the FOB keys 200, 201, . . . . For example, name information having a key ID "AA0001" corresponds to "Mr. A"; and, a key ID "AA0002", "Ms. B". The "Setting Data" column 320 contains therein the acceleration suppression control valid/invalid setting data 23 (FIG. 2). The "Activation Enable/Disable Data" column 330 contains therein the acceleration suppression control activation enable/disable data 24 (FIG. 2). Note that the "Setting Data" column 320 and the "Activation Enable/Disable Data" column 330 are collectively referred to as an "Acceleration Suppression Valid/Invalid Data" column 350.

Returning to explanation of FIG. 2, the vehicle control part 10: is a CPU; and executes a program to thereby realize respective functions of a communication control part 13, a display control part 14, an acceleration suppression control part against sudden accelerator step-down 11, and a control switch part 12. The communication control part 13 is a function part that controls the communication part 1. The display control part 14 is a function part that controls the display operation part 2. The acceleration suppression control part against sudden accelerator step-down 11 is a function part that controls the actuator 3 such that, when a driver having the specific FOB key 200 drives the vehicle 100 and suddenly steps down the acceleration pedal with a speed of the step-down exceeding a prescribed threshold, a speed of the vehicle 100 is limited (a response suppression). More specifically, the acceleration suppression control part against sudden accelerator step-down 11 references the acceleration suppression control activation enable/disable data 24 (the "activation enable/disable data" column 330 (FIG. 3)), and if the data 24 is determined to be "enable", the part 24 provides the acceleration suppression control against sudden accelerator step-down. If the data 24 is determined to be "disable", the part 24 does not provide the acceleration suppression control against sudden accelerator step-down.

The control switch 12 is a function part that switches the acceleration suppression control activation enable/disable data 24 from "disable" to "enable" in response to an operation of the display operation part 2 by the driver. The configuration makes it possible for the driver to switch the acceleration suppression control activation enable/disable data 24 to "valid" by operating the display operation part 2, even when the driver carries the FOB key 200 with the acceleration suppression control valid/invalid setting data 73 having been set to "invalid" and the acceleration suppression control activation enable/disable data 24 is therefore set to "disable". That is, even when the driver carries with him/her the FOB key 200 in which the acceleration suppression control valid/invalid setting data 73 has been set to "disable", the acceleration suppression control against sudden accelerator step-down can be performed.

Figure 4:
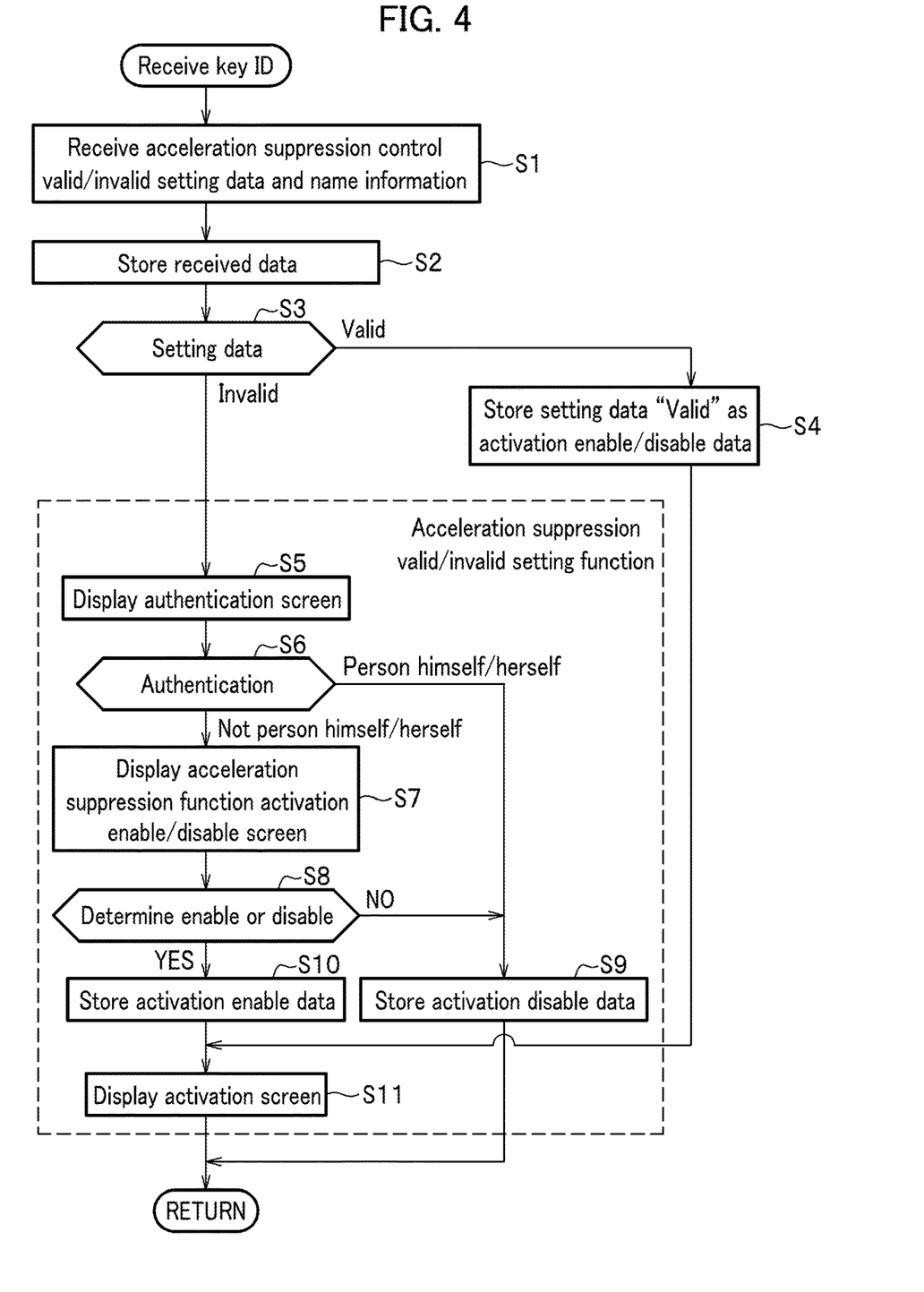
FIG. 4 is a flowchart for explaining operations when a key ID is received according to the embodiment.

FIG. 4 is a flowchart for explaining operations performed when a key ID is received.

A flow of FIG. 4 starts when the key ID 71 same as the key ID 21 (FIG. 2) is received from the FOB key 200. The acceleration suppression control part against sudden accelerator step-down 11 (FIG. 2) receives the acceleration suppression control valid/invalid setting data 73 and the name information 72 from the FOB key 200 (S1). After S1, the acceleration suppression control part against sudden accelerator step-down 11: stores the received acceleration suppression control valid/invalid setting data 73 in the storage part 20 as the acceleration suppression control valid/invalid setting data 23; and also stores the received name information 72 in the storage part 20 as the name information 22 (S2). After S2, the acceleration suppression control part against sudden accelerator step-down 11 determines whether the acceleration suppression control valid/invalid setting data 23 is "valid" or "invalid" (S3).

Figure 5A:
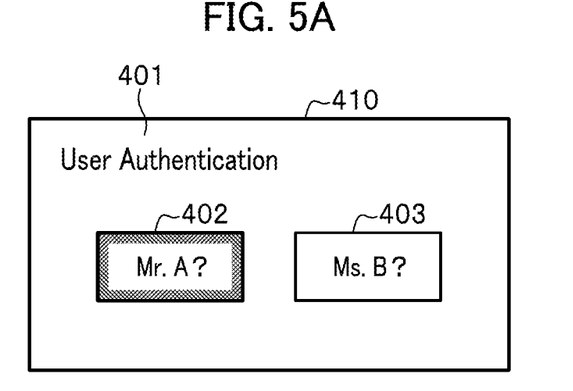
FIG. 5A is a diagram illustrating an example of a user authentication screen according to the embodiment.

If the acceleration suppression control valid/invalid setting data 23 is determined to have been set to "invalid" ("invalid" in S3), the acceleration suppression control part against sudden accelerator step-down 11 displays an authentication screen in the display operation part 2 (FIG. 2) (S5). FIG. 5A is a diagram illustrating an example of a user authentication screen. A user authentication screen 410 has a character string of "User Authentication", a "Mr. A?" button 402, and a "Ms. B?" button 403. That is, the user authentication screen 410 displays the name information 22 corresponding to one or each of a plurality of the key IDs 21 stored in the storage part 20. An operator (the driver) of the screen 410 selects either of the buttons 402, 403. The configuration makes it possible for the acceleration suppression control part against sudden accelerator step-down 11 to recognize who is the operator (driver) even when the operator carries any one of the FOB keys 200, 201, . . . .

After S5, the acceleration suppression control part against sudden accelerator step-down 11 determines whether or not the operator (driver) is a person himself/herself (S6). More specifically, the acceleration suppression control part against sudden accelerator step-down 11: determines that, when a name selected in the user authentication screen 410 matches the name information 22 corresponding to the FOB keys 200, 201, . . . , the operator (driver) is the "Person himself/herself"; and, when the name selected in the user authentication screen 410 does not match the name information 22 corresponding to the FOB keys 200, 201, . . . , the operator (driver) is "Not person himself/herself". When the operator (driver) is determined to be "Not person himself/herself", ("Not person himself/herself" in S6), the acceleration suppression control part against sudden accelerator step-down 11 displays an acceleration suppression function activation enable/disable screen 420 (FIG. 5B) in the display operation part 2 (S7).

Figure 5B:
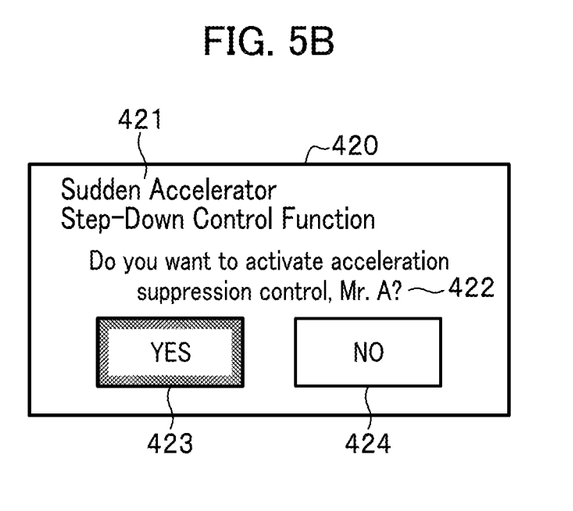
FIG. 5B is a diagram illustrating an example of an acceleration suppression function activation enable/disable screen according to the embodiment.

FIG. 5B illustrates an example of the acceleration suppression function activation enable/disable screen 420.

The acceleration suppression function activation enable/disable screen 420 has a character string of "Sudden Accelerator Step-Down Control Function" 421, a character string of "Do you want to activate acceleration suppression control, Mr. A?" 422, a "YES" button 423, and a "NO" button 424.

After the display of S7, the acceleration suppression control part against sudden accelerator step-down 11 determines whether or not the acceleration suppression control is enabled (S8). If the "YES" button 423 is pressed down ("YES" in S8), the acceleration suppression control part against sudden accelerator step-down 11 stores "enable" as activation enable data in the acceleration suppression control activation enable/disable data 24 (FIG. 2) (S10). After S10 is performed, the acceleration suppression control part against sudden accelerator step-down 11 displays a sudden accelerator step-down control activation screen in the display operation part 2 (S11), and the processing thus terminates.

Figure 5C:
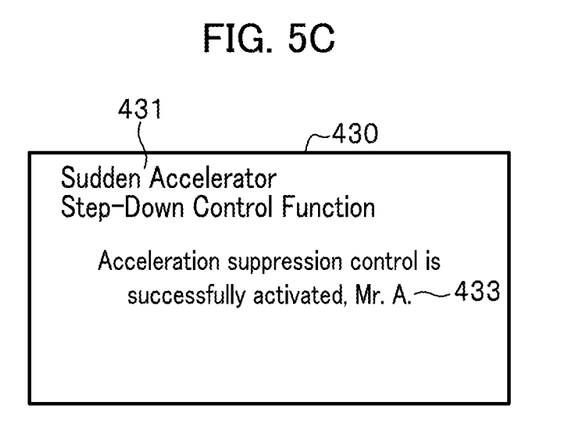
FIG. 5C is a diagram illustrating an example of a sudden accelerator step-down control activation screen according to the embodiment.

FIG. 5C illustrates an example of a sudden accelerator step-down control activation screen.

The sudden accelerator step-down control activation screen 430 has a character string of "Sudden Accelerator Step-Down Control Function" 431 and a character string of "Acceleration suppression control is successfully activated, Mr. A." 433. The configuration makes it possible for the operator (driver) to recognize that the the acceleration suppression control against sudden accelerator step-down has started up.

In the meanwhile, if the "NO" button 424 is pressed down ("NO" in S8) or the authentication is determined to be "Person himself/herself" ("Person himself/herself" in S6), the acceleration suppression control part against sudden accelerator step-down 11 stores "disable" as activation disable data in the acceleration suppression control activation enable/disable data 24 (S9), and the processing terminates.

If the acceleration suppression control valid/invalid setting data 23 is determined to be "valid" ("valid" in S3), the acceleration suppression control part against sudden accelerator step-down 11: stores the acceleration suppression control valid/invalid setting data 23 as the acceleration suppression control activation enable/disable data 24 (S4); and displays the sudden accelerator step-down control activation screen in the display operation part 2 (S11), which terminates the processing.

As described above, the control modification system for vehicle 1000 (FIG. 2) according to the embodiment is configured such that a driver carries any one of a plurality of the FOB keys 200, 201, . . . , with which the driver locks or unlocks a door of the vehicle 100. The FOB key 200 stores therein the key ID 71 and the acceleration suppression control valid/invalid setting data 73. For example, the FOB key 200 stores therein "valid" as the acceleration suppression control valid/invalid setting data 73; and the FOB key 201 "invalid".

The vehicle 100 stores therein the key ID 21 for each of the FOB keys 200, 201; and also stores therein the acceleration suppression control activation enable/disable data 24. When the received key ID 71 matches the key ID 21, the vehicle 100: receives the acceleration suppression control valid/invalid setting data 73 from the FOB keys 200, 201, . . . ; and stores a copy of the received acceleration suppression control valid/invalid setting data 73 as the acceleration suppression control activation enable/disable data 24. The vehicle 100 performs an acceleration suppression control based on the acceleration suppression control activation enable/disable data 24 selected by the operator (driver) via the display operation part 2, independently from the received acceleration suppression control valid/invalid setting data 73.

The configuration described above makes it possible that, even when, for example, an elderly person mistakenly carries the FOB key 201 with the acceleration suppression control set to "invalid" therein, instead of the FOB key 200 with the acceleration suppression control set to "valid" therein, it is not necessary for the person to unlock and lock the door again and return home to take the FOB key 200 with him/her. In other words, operability until when the acceleration suppression function against sudden accelerator step-down is realized is improved. In another case in which a person is required to drive while on the go, the person as a driver (a user) can activate an acceleration suppression control by using an operation of the display operation part 2. The user himself/herself can make the acceleration suppression control valid and can start up the acceleration suppression control even with an improper FOB key.

In the embodiment, the display operation part 2 displays the acceleration suppression function activation enable/disable screen 420 (FIG. 5B) in which a driver can select whether an acceleration suppression control is made valid or invalid. This makes it possible for the driver to recognize that a current state of the control is valid or invalid, thus allowing safety to be increased.

In the embodiment, when a driver carries the FOB key 201 with the acceleration suppression control set to "invalid" therein, the display operation part 2 displays the acceleration suppression function activation enable/disable screen 420 (FIG. 5B). When the driver carries the FOB key 200 with the acceleration suppression control set to "valid" therein, the display operation part 2 will not display the acceleration suppression function activation enable/disable screen 420 (FIG. 5B). The configuration makes it possible for the driver to, when the driver carries the FOB key 200 with the acceleration suppression control set to "valid" therein, eliminate a need for an input operation on the acceleration suppression function activation enable/disable screen, thus allowing a driver's operation to be reduced. Additionally, the driver can change a setting of the acceleration suppression control, only when he/she carries the FOB key 201 with the acceleration suppression control set to "invalid" therein.

[Variation]

The present invention is not limited to that explained in the above-described embodiment and can make various modifications as follows.

(1) In the above-described embodiment, the acceleration suppression control valid/invalid setting data 73 is stored in in the FOB key 200; and the acceleration suppression control part against sudden accelerator step-down 11 (FIG. 2) of the vehicle 100 performs an acceleration suppression control, based on the stored acceleration suppression control valid/invalid setting data 73 (FIG. 2). The present invention is not, however, limited to the embodiment. The acceleration suppression control valid/invalid setting data 73 (the acceleration suppression control valid/invalid setting data 23) corresponding to the key ID 71 may be stored in the vehicle 100. When the vehicle 100 receives the key ID 21 from the FOB key 200, the vehicle control part 10 may perform an acceleration suppression control, based on the acceleration suppression control valid/invalid setting data 23 corresponding to the the key ID 21. Note that the setting change part 15 (FIG. 2) updates the acceleration suppression control valid/invalid setting data 23.

(2) The vehicle 100 may receive the key ID 71 or any other appropriate data not from the FOB key 200 but from a smartphone or the like (a so-called digital key).

(3) It is assumed in the above-described embodiment that a single unit of the FOB key 200 is carried into the vehicle 100. Another case is assumed in which a plurality of the FOB keys 200, 201, . . . are carried into the vehicle 100 without any user's operation, and the vehicle control part 10 (FIG. 2) thus fails to determination whether the acceleration suppression function against sudden accelerator step-down is valid or invalid. In this case, if the acceleration suppression function against sudden accelerator step-down is set to valid in any of the FOB keys 200, 201, . . . carried into the vehicle 100, the acceleration suppression function against sudden accelerator step-down of the vehicle may be valid.

- 1, 51 communication part
- 2 display operation part (display part)
- 4 accelerator pedal sensor
- 10 vehicle control part
- 11 acceleration suppression control part against sudden accelerator step-down (response suppression control part against sudden accelerator step-down)
- 12 control switch part
- 15, 61 setting change part
- 21, 71 key ID
- 23, 73 acceleration suppression control valid/invalid setting data (setting information)
- 24 acceleration suppression control activation enable/disable data
- 60 key control part
- 100 vehicle (control modification device for vehicle)
- 200, 201 FOB key (ID key)
- 250 PC (setting change part)
- 300 acceleration suppression valid/invalid data
- 400 acceleration suppression valid/invalid setting screen
- 410 user authentication screen
- 420 acceleration suppression function activation enable/disable screen (screen prompting for selection and switching)
- 430 sudden accelerator step-down control activation screen
- 1000 control modification system for vehicle (control modification device for vehicle)

The invention claimed is:

1. A control modification device for a vehicle, comprising:
an acceleration suppression control part against sudden accelerator step-down that is mounted in the vehicle and is configured to limit a speed of the vehicle when a speed of an accelerator pedal step-down exceeds a prescribed threshold;
an identification (ID) key that stores therein setting information showing whether a function of the acceleration suppression control part against sudden accelerator step-down is made valid or invalid;
a setting change part that is configured to recognize the setting information stored in the ID key and change a setting based on the recognized result; and
a control switch part that is mounted on the vehicle and is configured to prompt a driver of the vehicle to select and switch whether the function of the acceleration suppression control part against sudden accelerator step-down is made valid or invalid, independently from the result of the setting change.

2. The control modification device for the vehicle according to claim 1,
further comprising a display part having a screen in which the driver of the vehicle is prompted to select and switch whether the function of the acceleration suppression control part against sudden accelerator step-down is made valid or invalid, independently from the result of the setting change.

3. The control modification device for the vehicle according to claim 2,
wherein, only when the setting information stored in the ID key is set to invalid, the screen in which the driver of the vehicle is prompted to select and switch the function appears in the display part.

4. A control modification device for a vehicle, comprising:
a wireless communication part that is configured to receive a key identification (ID) from an identification (ID) key of the vehicle and also receive setting information showing whether an acceleration suppression function against sudden accelerator step-down is made valid or invalid, the acceleration suppression function against sudden accelerator step-down being used for limiting a speed of the vehicle;
a control switch part that is configured to prompt a driver of the vehicle to select and switch whether the acceleration suppression function against sudden accelerator step-down is made valid or invalid, independently from the received setting information; and
an acceleration suppression control part against sudden accelerator step-down that is configured to limit the speed of the vehicle, based on information prompted to be switched by the control switch part, when a speed of an accelerator pedal step-down exceeds a prescribed threshold.

5. The control modification device for the vehicle according to claim 4,
further comprising a setting change part that is configured to change the received setting information and change the setting information stored in the ID key to a setting value corresponding to the received and changed setting information.

\* \* \* \* \*